Nov. 18, 1941.  A. HOLMES  2,262,763
AGRICULTURAL MACHINE
Filed March 26, 1940   4 Sheets-Sheet 1
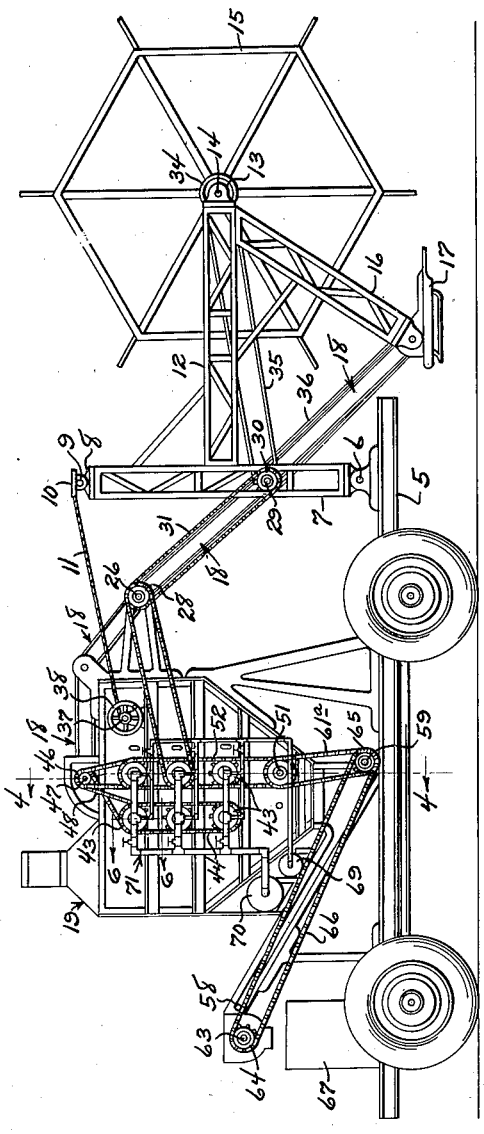
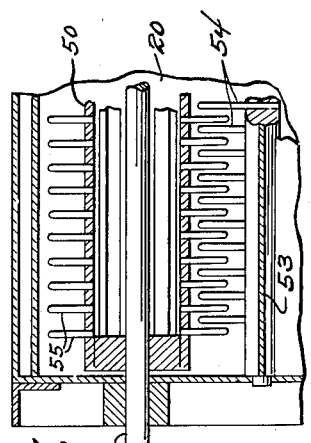
Arthur Holmes
INVENTOR
BY Victor J. Evans & Co.
ATTORNEYS
WITNESS

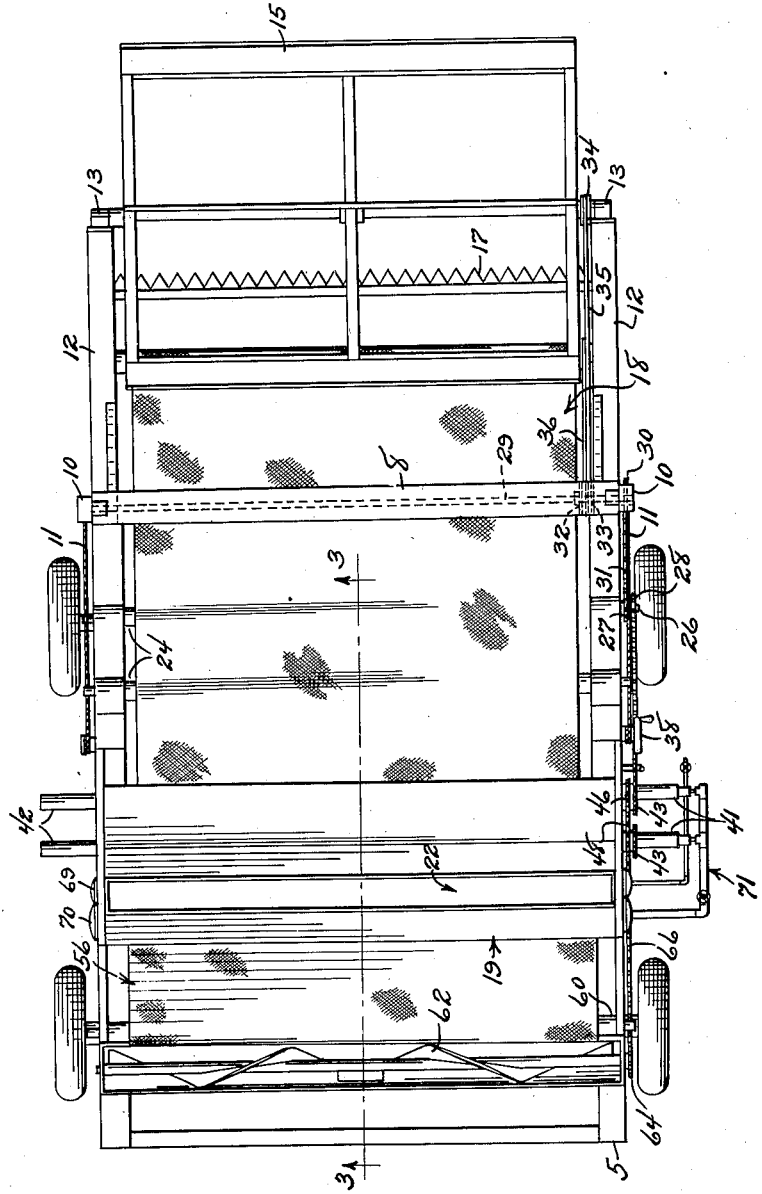

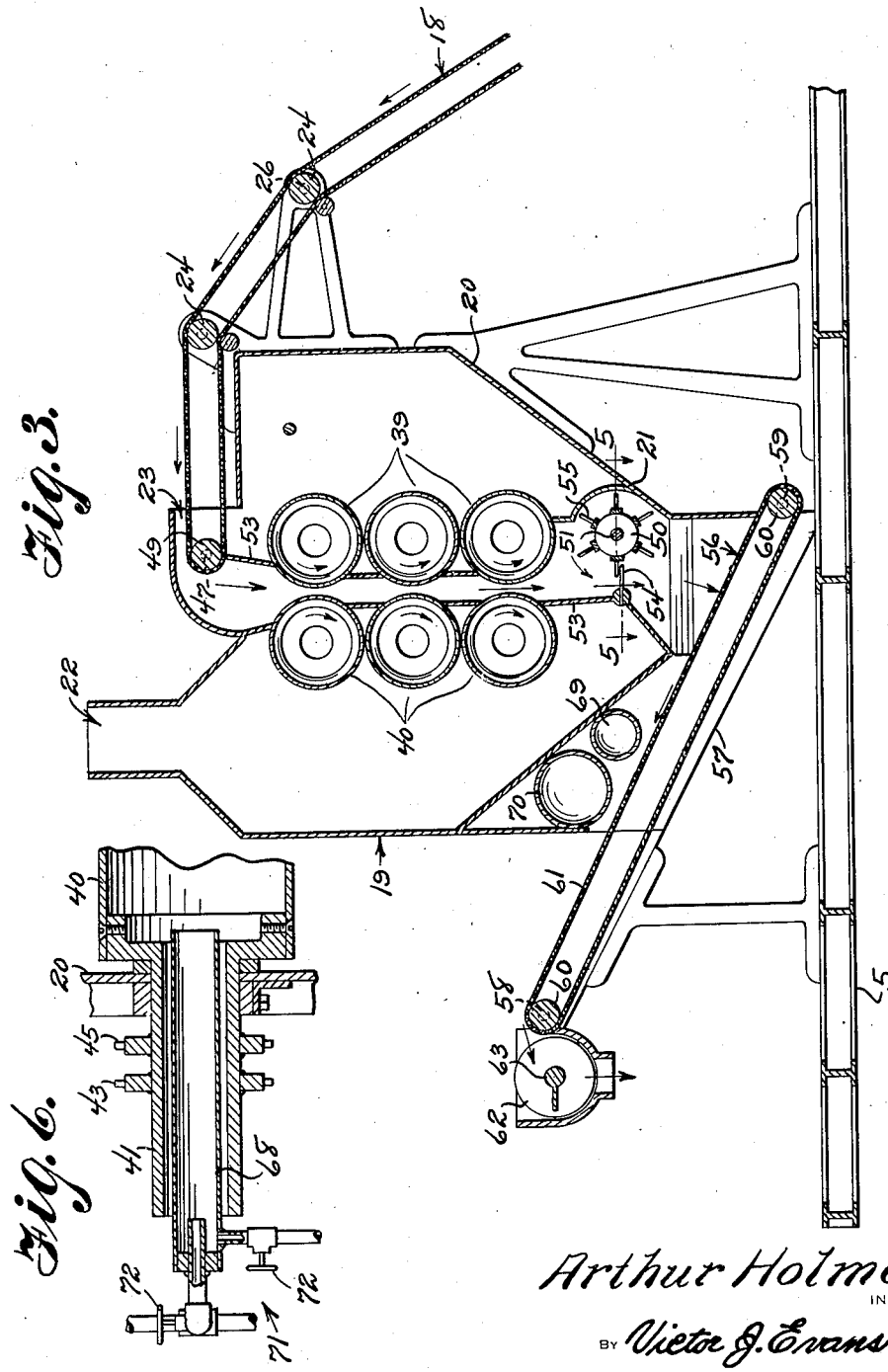

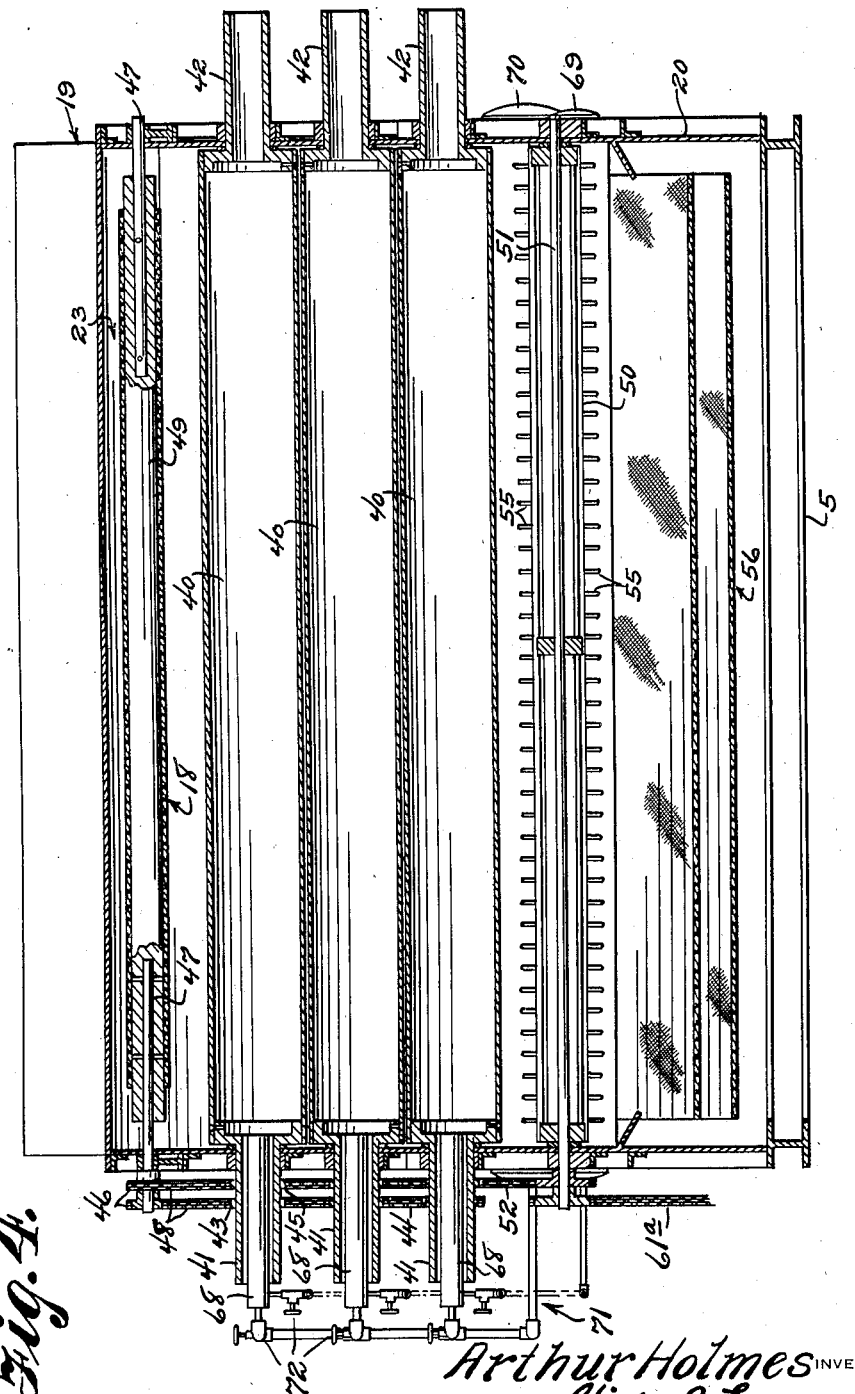

Patented Nov. 18, 1941

2,262,763

UNITED STATES PATENT OFFICE 2,262,763

AGRICULTURAL MACHINE

Arthur Holmes, Denison, Tex.

Application March 26, 1940, Serial No. 326,075

4 Claims. (Cl. 34—177)

My invention relates to agricultural machines and has as one of the principal objects thereof the provision of an agricultural machine equipped with means for harvesting hay or similar crops together with means for drying or removing the moisture from the crops without destroying their nutritive qualities or detracting from their appearance, thus enabling the crops to be ground to provide meal or food in a suitable granular or comminuted form if desired.

Another object of my invention is to provide a machine of the above described character which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 1 is a side elevation of my invention illustrating the reel and sickle bar in harvesting position.

Figure 2 is a top plan view of the invention.

Figure 3 is a detail sectional view taken on the line 3—3 of Figure 2.

Figure 4 is a vertical sectional view taken on the line 4—4 of Figure 1.

Figure 5 is a detail horizontal sectional view taken on the line 5—5 of Figure 3.

Figure 6 is a detail sectional view taken on the line 6—6 of Figure 1.

In practicing my invention, as illustrated in the drawings, I provide a wheel frame 5 having pivotally connected to its front end, as at 6, a pair of substantially vertical frame members 7 connected together at their upper ends by a cross member 8. The upper ends of the members 7 have pivoted thereto, as at 9, cable connectors 10 to which are secured the front ends of a pair of rearwardly extending spaced cables 11 for a purpose hereinafter set forth. The members 7 between their upper and lower ends have fixed thereto the rear ends of a pair of forwardly extending horizontal members 12, the latter having secured to their front ends a pair of bearings 13 through which is rotatably journaled a transverse shaft 14 having fixed thereto a harvesting reel 15 of ordinary construction.

Postjacent the members 7 the frame has mounted thereon crop heating means 19 comprising a casing 20 formed with a funnel-shaped bottom 21 and a top section provided with steam outlet and conveyor discharge openings 22 and 23 respectively, the latter opening receiving the upper or discharge end of the conveyor 18 as clearly illustrated in Figure 3 of the drawings. The conveyor 18 is of the endless belt type and has its upper end trained over a plurality of rollers 24 rotatably mounted on the casing 20 and its lower end trained over a roller (not shown) rotatably mounted on the sickle bar assembly 17.

One of the rollers 24 constitutes a drive roller 25 fixed to a shaft 26, one end of the latter having fixed thereto inner and outer sprockets 27 and 28 respectively. One of the members 7 is provided with a bearing through which is journaled a shaft 29 on which is mounted a sprocket 30 connected to the sprocket 27 by means of a chain 31. Said shaft 29 has also fixed thereto inner and outer pulleys 32 and 33 respectively, the pulley 32 being connected to a pulley 34 fixed on the shaft 14 through the medium of a belt 35. The pulley 33 is connected to the drive mechanism (not shown) of the sickle bar assembly through the medium of a belt 36 whereby to effect operation of the sickle bar assembly 17 in the usual manner.

Adjacent the front thereof the casing has journaled therethrough a shaft 37 provided on its outer ends with drums to which are attached the rear ends of the cables 11 whereby said cables may be wound or unwound on said drums to effect raising and lowering of the reel 15 and sickle bar assembly 17 through the medium of the pivoted members 7. One end of the shaft 37 has fixed thereto a hand-wheel 38 for operating said shaft in a desired direction, it being understood that a suitable ratchet and pawl mechanism (not shown) is employed to maintain the members 7 in a desired position with respect to the casing 20. Subjacent the discharge end of the conveyor 18, the casing is provided with front and rear ternaries of hollow rollers 39 and 40 respectively, the rollers of each ternary being arranged one above the other as clearly illustrated in Figure 3 of the drawings.

The ends of the rollers 39 and 40 are provided with outwardly extending hollow shafts with those on one side of the casing constituting inlet connections 41 for the rollers and those on the opposite side of said casing constituting outlet connections 42 for said rollers. The shafts constituting the inlet connections 41 of each ternary of rollers are provided with sprockets 43 over which are trained chains 44 for effecting unitary rotation of each ternary of rollers. The uppermost shafts constituting the inlet connections 41 are provided with sprockets 45 each connected to a sprocket 46 fixed on a transverse shaft 47 through the medium of chains 48. The shaft 47 is fixed to a roller 49 over which the discharge end of the conveyor belt of the conveyor 18 is trained whereby to effect operation of the conveyor 18.

Subjacent the front ternary of rollers 39, the lower end of the casing 20 is provided with a transverse picker roller 50 fixed to a shaft 51 journaled through the casing 20 and having one end provided with a sprocket connected to a sprocket fixed to the shaft of the lowermost rollers 39 through the medium of a chain 52 whereby to effect operation of the picker roller 50. Between the rollers 39 and 40 the casing is provided with spaced vertically disposed partitions 53 constituting guard and scraper members which serve to retain the material, discharged from the conveyor 18, between the rollers 39 and 40 for drying the latter as hereinafter described and precluding the rollers from becoming clogged with said material.

The lower end of one of the partitions 53 extends an appreciable distance below the lowermost rollers 39 and has fixed thereto a plurality of spaced transversely disposed picker fingers 54 for coaction with similar fingers 55 fixed to the roller 50 for disintegrating the material as it is discharged downwardly from between the rollers 39 and 40.

Extending into the lower end of the casing 20 is the lower end of an upwardly and rearwardly extending conveyor 56 with its lower end arranged subjacent the roller 50 and fingers 54 whereby material disintegrated by the roller 50 is discharged onto said conveyor 56. The conveyor 56 comprises a frame 57 having upper and lower ends in which are journaled transverse upper and lower shafts 58 and 59 respectively and on which are fixed rollers 60 over which is trained an endless belt 61. One end of the shaft 59 has fixed thereto a sprocket connected to a similar sprocket fixed on the end of the shaft 51 by means of a chain 61a.

The upper end of the conveyor 56 has fixed thereto a transversely disposed spiral conveyor 62 and said spiral conveyor 62 is provided with a drive shaft 63 having a sprocket 64 connected to a sprocket 65 fixed on the shaft 59 through the medium of a chain 66 whereby to operate the conveyor 62. The conveyor 62 receives the material from the conveyor 56 and discharges the same into a suitable hopper 67 or the like mounted on the rear end of the frame 5 as clearly illustrated in Figure 1 of the drawings.

The intake connections 41 have extending therethrough burner nozzles 68, the outer ends of which are connected to fuel oil and compressed air tanks 69 and 70 respectively through the medium of pipe connections 71, the latter being provided with suitable control valves 72, thus enabling fuel to be fed to the nozzles 68 for maintaining a flame within the rollers 39 and 40, the outlet connections 42 serving to effect a distribution of heat within the rollers whereby the latter are heated and serve to dry the material discharged from the conveyor between the rollers.

From the foregoing it will be apparent that I have provided an agricultural machine having a sickle bar assembly and reel pivotally mounted on its front end together with means for heating harvested material and disintegrating the same as it is delivered from the machine in a relatively dry state for subsequent operation by a hammer mill or the like.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefore as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claims.

What I claim is:

1. A dryer for the purpose described, comprising a vertically disposed casing having an opening at its upper end intermediate the sides, a vertically disposed partition within the casing on each side of the opening and provided with a series of horizontally arranged oppositely disposed slots, hollow rollers mounted in the casing on the outside of the partitions and extending through the slots in close proximity to each other, heaters within the rollers, and a picker roller and picker fingers arranged within the lower end of the space between the partitions.

2. A dryer for the purpose described, comprising a vertically disposed casing having an opening at its upper end intermediate the sides, a vertically disposed partition within the casing on each side of the opening and provided with a series of horizontally arranged oppositely disposed slots, hollow rotating rollers mounted in the casing on the outside of the partitions and having a portion of their periphery extending through the slots in close proximity to each other, heaters within the rollers, picker fingers carried by the lower end of one of the partitions, and a picker roller rotatably mounted between the partitions and co-operating with the picker fingers.

3. A dryer for the purpose described, comprising a vertically disposed casing having an opening at its upper end intermediate the sides, a vertically disposed partition within the casing on each side of the opening and provided with a series of horizontally arranged oppositely disposed slots, hollow rollers mounted in the casing on the outside of the partitions in vertical rows engaging each other and having a portion of their periphery extending through the slots in close proximity to each other, heaters within the rollers, picker fingers rigidly carried by one of the partitions, a driven picker roller between the partitions and co-operating with the fingers.

4. A dryer for the purpose described, comprising a vertically disposed casing having an opening at its upper end intermediate the sides, means for feeding material into said opening, a vertically disposed partition within the casing on each side of the opening and provided with a series of horizontally arranged oppositely disposed slots, a hollow roller mounted in the casing on the outside of the partitions opposite each slot in vertical rows engaging each other and having portions of their peripheries extending through the slots in close proximity to each other, picker fingers carried by one of the partitions below the rollers, a rotary picker roller mounted between the partitions and co-operating with the picker fingers, and a conveyor arranged across the space between the partitions and adapted to receive the material from the picker roller and discharge it outside the casing.

ARTHUR HOLMES.